United States Patent Office 2,743,114
Patented Apr. 24, 1956

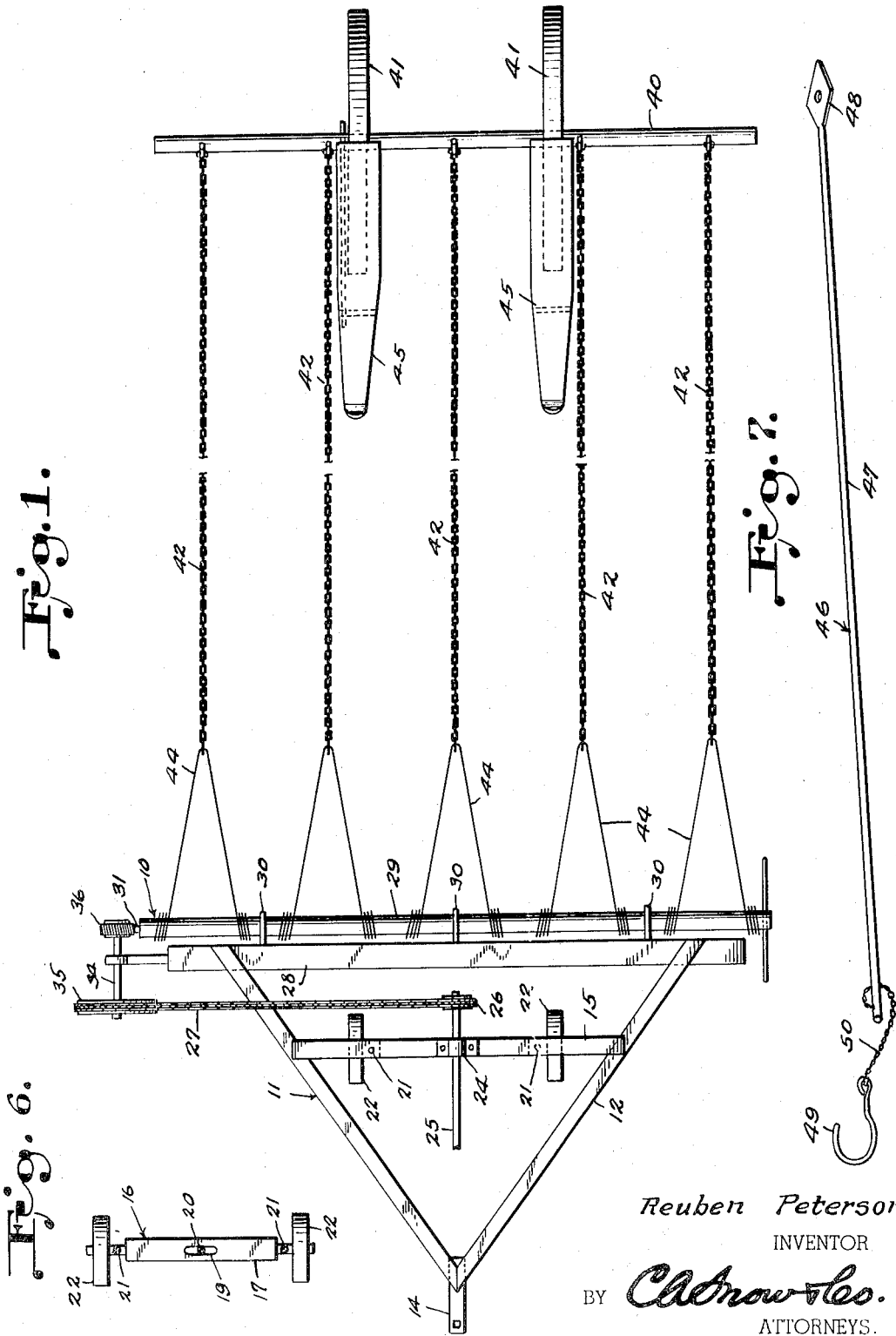

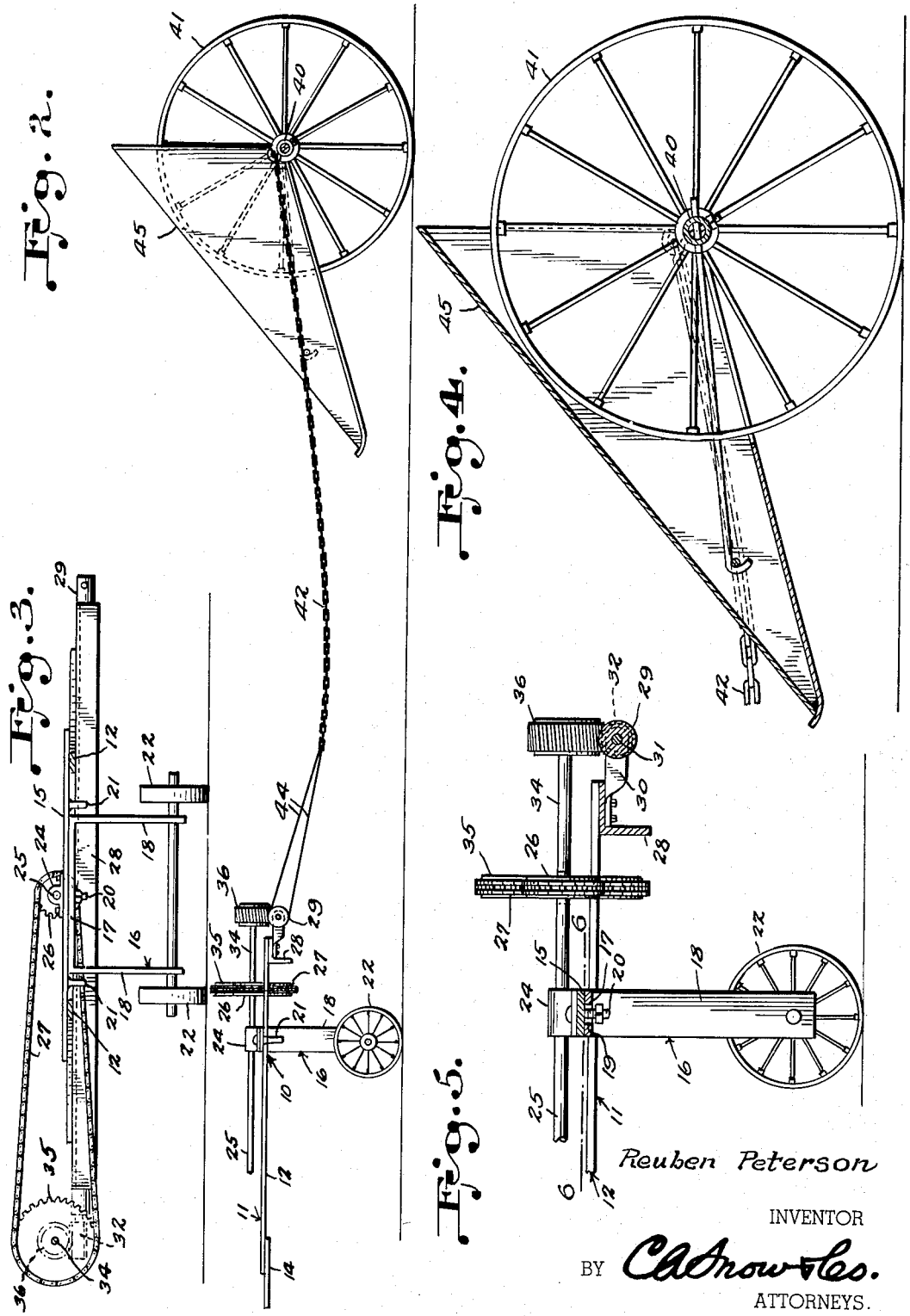

2,743,114

HAY STACK BUILDER AND MOVER

Reuben Peterson, Wessington Springs, S. Dak.

Application December 9, 1954, Serial No. 474,194

5 Claims. (Cl. 280—34)

This invention relates to a portable chain device upon which a hay stack may be built and moved for movement from one location to another.

It is an object of this invention to provide a hay stack builder and mover device of a kind to be more particularly described hereinafter detachably connectable with a tractor or truck by which the device may be towed after the hay stack is formed thereon.

Another object of this invention is to provide a device of this kind having a pair of longitudinally spaced apart wheeled beams connected together by longitudinally extending chains on which the hay stack is adapted to be built, one of the beams being rotatable for shortening the chain between the beams from a power take off shaft on the tractor.

Other and further objects and advantages of the invention will be hereinafter described and the novel features thereof defined in the appended claims.

In the drawings:

Figure 1 is a top plan view of the hay stack builder and moving device constructed to an embodiment of my invention.

Figure 2 is a side elevation of the hay stack builder and moving device.

Figure 3 is a front elevation, partly in section, of the front end of my device.

Figure 4 is a side elevation, partly broken away, partly in section, of the rear end of my device.

Figure 5 is a side elevation, partly broken away, partly in section, of the front end of my invention.

Figure 6 is a top plan view, partly in section, of the fifth wheel of the front end of my device taken on the line 6—6 of Figure 5.

Figure 7 is a perspective elevation of a chain threading needle used with my invention.

It is conventionally known that a series of chains dragged across the upper surface of the ground at the time of the formation of a hay stack will provide for the building of a hay stack thereon when the loose straw is cast upon the chains. After a hay stack has been built upon the dragged chains the chains may be used for moving the hay stack from one position to another. With this in mind, I have devised a hay stack builder and moving device on which a hay stack may be built and moved at the will of a person having this device.

Referring now more particularly to the drawings, the numeral 10 designates generally a hay stack builder and moving device constructed according to an embodiment of my invention.

The hay stack builder and moving device 10 is provided with a V-shaped yoke 11 at the front end thereof having a pair of longitudinally extending side arms 12 connected together at one end thereof, the convergent end, by the hitch connector 14 which may be adequately applied to the rear end of a truck or a tractor as the case may be.

The yoke 11 is provided with a supporting beam 15 engaged at its ends with each of the arms 12, intermediate the lengths thereof. The supporting beam 15 will overlie the upper end of a wheeled truck 16. A horizontally extending bight 17 is connected at its ends to the upper end of the vertically extending arms 18 for the uses and purposes of the device to be hereinafter described.

An elongated slot 19 is formed in the bight 17, intermediate the length thereof, and between the opposite ends within which a king pin 20 is slidable. The king pin and truck provide a fifth wheel for the device 10 rockably supported within the slot 19 when the bight 17 is slid to the desired position for use of the device 10.

Stops 21, depending from the supporting beam 15 will be engageable with the ends of the bight 17 to limit lateral movement of the truck.

Wheels 22 are rotatably carried by each of the arms 18 of the truck 16.

A sleeved bearing 24 is rigidly supported on the upper side of the supporting beam 15 through which a drive shaft 25 may be extended. The drive shaft 25 is operatively connected at one end, not shown in the drawings, with a tractor or other source of motive power. A sprocket 26 is secured to and rotatably connected on the drive shaft 25 at the center of the device 10. The sprocket 26 is operatively engaged with a driving chain 27 to position the sprocket 26 between the supporting beam 15 and the elongated beam 28 rearwardly of the supporting beam as clearly notable in Figure 1 of the drawings.

A winding cylinder 29 is rotatably carried by the rear end of the elongated beam 28 being rotatable in bearings 30 secured along the length of the beam on the rear surface thereof.

A shaft 31 secured on one end of the winding cylinder 29 extends outwardly therefrom having a gear 32 on one end thereof which is meshingly engageable with one end of a transverse shaft 34. A sprocket 35 is secured on one end of the transverse shaft 34 with a worm 36 on the other end thereof so that upon rotation of the drive shaft 25 the winding cylinder 29 will be effectively rotated.

An elongated rear axle 40 having enlarged rear wheels 41 rotatable thereon is to be positioned longitudinally from the beams, described above, there being a connecting chain 42 between the rear axle and the winding cylinder 29. While one end of the chain 42 is secured to the rear axle 40 the other end of the chain is secured to a position on the drum 29, this end of the chain being connected by a cable 44 rather than to a link of the chain.

A fender 45 is carried by the rear axle for covering the upper side of the rear wheel so that the rear wheel will not be obstructed by hay or any other material being cast onto the chain 42 during the process of building a hay stack or moving the hay stack with the builder and moving device 10 heretofore described.

While a hay stack is to be formed of piles of straw lying on the chain 42 I have provided a tool for connecting the hay stacks or piles of straw together and on the device 10.

The tool 46 is formed of an elongated bar 47 having a spade 48 at one end thereof and a hook 49 at the other end so that the tool may be engaged through a pile of hay independently of the device 10. The hook 49 may be connected to this other end of the bar 47 by a chain 50 so that the hook is resiliently and flexibly connected to the other end of the tool remote from the spade 48 which will initially engage through the pile of hay being used to form the hay stack.

While the specific details of one embodiment of this invention have been herein shown and described, the invention is not confined thereto as changes and alterations may be made without departing from the spirit and scope thereof as defined in the appended claims.

I claim:

1. A hay stack builder and moving device comprising a pair of parallel longitudinally spaced apart transversely extending front and rear wheel axles, a front truck rockably connected on said front axle, an elongated transverse tubular member rotatably carried by said truck, means for rotating said member, a plurality of elongated flexible resilient members connected at one end thereof to said tubular member, the other ends of said flexible members being secured to said rear axle, wheels rotatable on said front axle, wheels rotatable on said rear axle and vertically extending fenders secured to said rear axle.

2. A hay stack remover and moving device comprising a front transversely extending beam, a wheeled truck depending from said beam, a winding tube on said truck transversely thereof, means for rotating said tube, an elongated transversely extending rear axle spaced longitudinally from said beam, wheels rotatably mounted on said truck, enlarged wheels rotatable on said rear axle having a diameter greater than said first mentioned wheels, rear wheel fenders on said rear axle covering said rear wheels and elongated flexible elements connected at one end thereof to said winding tube, the other ends of said flexible elements being secured to said rear axle.

3. A hay stack builder and removing device comprising a V-shaped yoke, a wheeled truck rockably secured on said yoke, a transverse beam on said yoke spaced from said truck, a winding cylinder rotatably carried by said beam, means for rotating said cylinder, an elongated rear axle, enlarged wheels on said rear axle, a wheeled fender secured to said rear axle covering said latter wheel and elongated flexible means connected at the ends thereof to said winding cylinder and said rear axle for drawing said rear axle toward said truck upon rotation of said winding cylinder.

4. A hay stack builder and moving device of the kind described comprising a V-shaped drawing yoke, a transverse supporting beam on said yoke intermediate the length thereof, an elongated beam on an end of said yoke parallel to said supporting beam and spaced longitudinally therefrom, an inverted U-shaped wheeled truck depending from said supporting beam and rockably connected thereto for movement about a vertical axis, a winding cylinder rotatably connected to said elongated beam, means for rotating said winding cylinder, an elongated rear axle spaced from and parallel to said yoke, enlarged wheels rotatable on said rear axle intermediate the ends thereof and elongated flexible means secured at one end thereof to said winding cylinder and at the other end to said rear axle for drawing said rear axle toward said truck and elongated beam upon rotation of said winding cylinder.

5. A hay stack builder and moving device as set forth in claim 4 including wheeled fenders secured to said rear axle for covering said rear wheels.

References Cited in the file of this patent

UNITED STATES PATENTS

| | | |
|---|---|---|
| 717,962 | Babbitt | Jan. 6, 1903 |
| 1,106,104 | Marx | Aug. 4, 1914 |
| 1,774,691 | Anderson | Sept. 2, 1930 |